United States Patent
Sung et al.

(10) Patent No.: US 9,031,411 B2
(45) Date of Patent: May 12, 2015

(54) WAVELENGTH-DIVISION MULTIPLEXING (WDM) OPTICAL FIBER NETWORK SYSTEM

(71) Applicant: National Chiao Tung University, Hsinchu (TW)

(72) Inventors: Jiun-Yu Sung, New Taipei (TW); Chi-Wai Chow, Fanling Nt. (HK); Chien-Hung Yeh, New Taipei (TW)

(73) Assignee: National Chiao Tung University, Hsinchu (TW)

( * ) Notice: Subject to any disclaimer, the term of this patent is extended or adjusted under 35 U.S.C. 154(b) by 12 days.

(21) Appl. No.: 14/047,126

(22) Filed: Oct. 7, 2013

(65) Prior Publication Data

US 2014/0369690 A1 Dec. 18, 2014

(30) Foreign Application Priority Data

Jun. 14, 2013 (TW) .............................. 102121139 A

(51) Int. Cl.
| | |
|---|---|
| H04B 10/50 | (2013.01) |
| H04B 10/60 | (2013.01) |
| H04J 14/02 | (2006.01) |
| H04B 1/713 | (2011.01) |

(52) U.S. Cl.
CPC ............. *H04J 14/0227* (2013.01); *H04B 1/713* (2013.01)

(58) Field of Classification Search
CPC ... H04J 13/00; H04J 13/0003; H04J 13/0007; H04J 13/0074; H04J 13/0077; H04J 14/00; H04J 14/02; H04J 14/0201; H04J 14/0202; H04J 14/0215; H04J 14/0216; H04J 14/0227; H04J 14/023; H04J 14/0234; H04J 14/0242; H04J 2013/00; H04B 1/69; H04B 1/713
See application file for complete search history.

(56) References Cited

U.S. PATENT DOCUMENTS

| | | | |
|---|---|---|---|
| 7,609,968 B2 * | 10/2009 | Lee et al. ...................... | 398/79 |
| 2011/0029773 A1 | 2/2011 | Effenberger | |
| 2011/0214160 A1 | 9/2011 | Costa et al. | |
| 2012/0128155 A1 | 5/2012 | Effenberger | |

OTHER PUBLICATIONS

David Gutierrez, Jinwoo Cho and Leonid G. Kazovsky; TDM-PON Security Issues: Upstream Encryption is Needed; Photonics and Networking Research Laboratory, Standard University, National Fiber Optic Engineers Conference (NFOEC), 2007, JWA83.

* cited by examiner

Primary Examiner — Darren E Wolf
(74) Attorney, Agent, or Firm — Rosenberg, Klein & Lee

(57) ABSTRACT

A wavelength-division multiplexing (WDM) optical fiber network system is disclosed, which comprises a signal provider generating at least one set of wavelength signals of a plurality of different wavelengths and coupled to a plurality of modulation modules. The modulation modules respectively coupled to a user receiver. The modulation module comprises a control unit generating a random sequence and a control signal corresponding to the random sequence, and transmitting the control signal to a first modulation unit. The control unit is coupled to the signal provider to receive the wavelength signals and controls the first modulation to retrieve a wavelength signal according to the control signal. The control unit rapidly changes the control signal according to the random sequence whereby the first modulation unit rapidly retrieves the wavelength signals of different wavelengths and transmits them to the user receiver, so as to prevent a specific wavelength from attack.

11 Claims, 9 Drawing Sheets

U.S. 9,031,411 B2

WAVELENGTH-DIVISION MULTIPLEXING (WDM) OPTICAL FIBER NETWORK SYSTEM

This application claims priority for Taiwan patent application no. 102121139 filed on Jun. 14, 2013, the content of which is incorporated in its entirely.

BACKGROUND OF THE INVENTION

1. Field of the Invention

The present invention relates to an optical communication, particularly to a wavelength-division multiplexing (WDM) optical fiber network system with high security.

2. Description of the Related Art

In order to enjoy the higher quality and multi services for the Internet access, one of trends of developing future technology is toward the more and more rapid transmission technique. As a result, for an intermediary network or a high-speed network in the future, wavelength division multiplexing (WDM) technology of a fiber network is viewed as an important technique for next generation network. Except for high speed, communication security is also the important issue that people concerned.

Presently, the fiber network adopts time division multiplexing (TDM) technology. In general, the broadcasting of downstream signals of TDM technology may make a security issue. However, according to the thesis "TDM-PON security Issues: Upstream Encryption is Needed", the security issue for upstream signals can be not ignored.

Presently, the solution of information security is mainly bidirectional identification of a provider and a user and codes and encryption of transmission data. The identification and encryption relate to receiving packets and processing headers. Since the signals are correctly received by the user, a special algorithm or a coded method is broken which make an issue of communication security. In order to improve security, the numbers of the packets and the headers are increased which wastes bandwidth.

Due to the higher data transmission capacity and the higher security of wavelength-division multiplexing (WDM) and WDM-time-division multiplexing (TDM) optical networks, the two networks are viewed as one of main technologies of the next generation passive optical network (PON). However, the network rules of the technologies have a plenty of room for improvement. The WDM-PON differs from the TDM-PON and does not broadcast downstream signals. As a result, the WDM-PON is relatively safe. Thus, few people discuss the security issue of WDM-PON and WDM-TDM-PON in the future. In practice, as long as a malicious attacker has enough technique to find out the wavelength used by the WDM-PON and the WDM-TDM-PON, attack is still achieved.

To overcome the abovementioned problems, the present invention provides a wavelength-division multiplexing (WDM) optical fiber network system, so as to solve the aforementioned problems of the prior art.

SUMMARY OF THE INVENTION

A primary objective of the present invention is to provide a wavelength-division multiplexing (WDM) optical fiber network system, which generates a pseudo random sequence merely identified by a signal provider and a user receiver, and uses the pseudo random sequence to rapidly change wavelength signals, so as to prevent a specific wavelength signal from attack, whereby the wavelength signal is not invaded and varied.

Another objective of the present invention is to provide a WDM optical fiber network system, which rapidly changes wavelengths. Since general instruments are hard to detect the change, the security of a fiber network can be improved.

To achieve the abovementioned objectives, the present invention provides a WDM optical fiber network system, which comprises a signal provider generating a least one set of wavelength signals of a plurality of different wavelengths. A plurality of modulation modules coupled to the signal provider. Each modulation module comprises a control unit generating a random sequence and a control signal corresponding to the random sequence and transmits the control signal to at least one first modulation unit coupled to the signal provider. The first modulation unit receives the wavelength signals, retrieves one wavelength signal according to the control signal, and rapidly changes the control signal according to the random sequence, whereby the first modulation unit rapidly retrieves the wavelength signals of the different wavelengths and transmits them to user receivers.

Below, the embodiments are described in detail in cooperation with the drawings to make easily understood the technical contents, characteristics and accomplishments of the present invention.

DETAILED DESCRIPTION OF THE INVENTION

The embodiment applies to a wavelength-division multiplexing (WDM) passive optical network (PON) or a wavelength-division multiplexing (WDM)-time-division multiplexing (TDM) passive optical network (PON). Refer to FIG.

Figure 1:
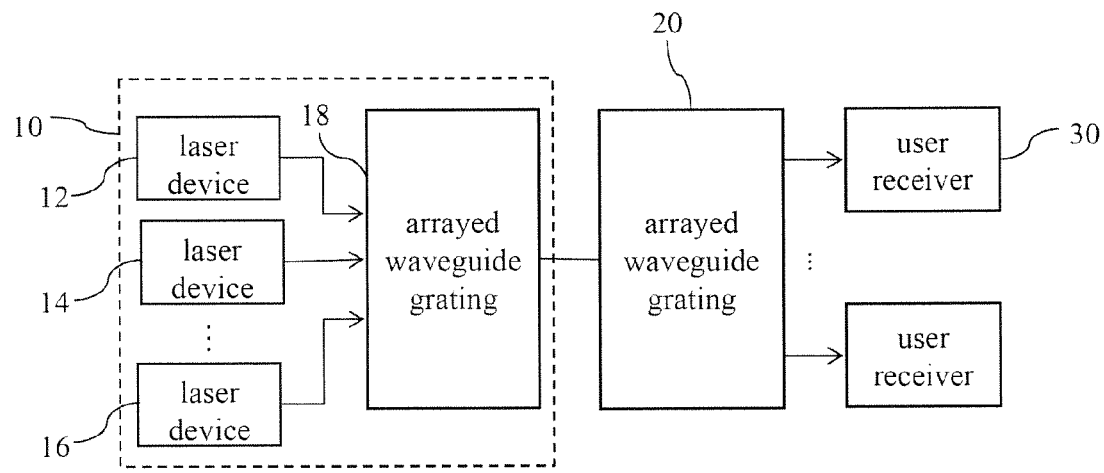
FIG. 1 is a schematic block diagram illustrating a wavelength-division multiplexing (WDM) passive optical network (PON) system according to an embodiment of the prior art.
Figure 2:
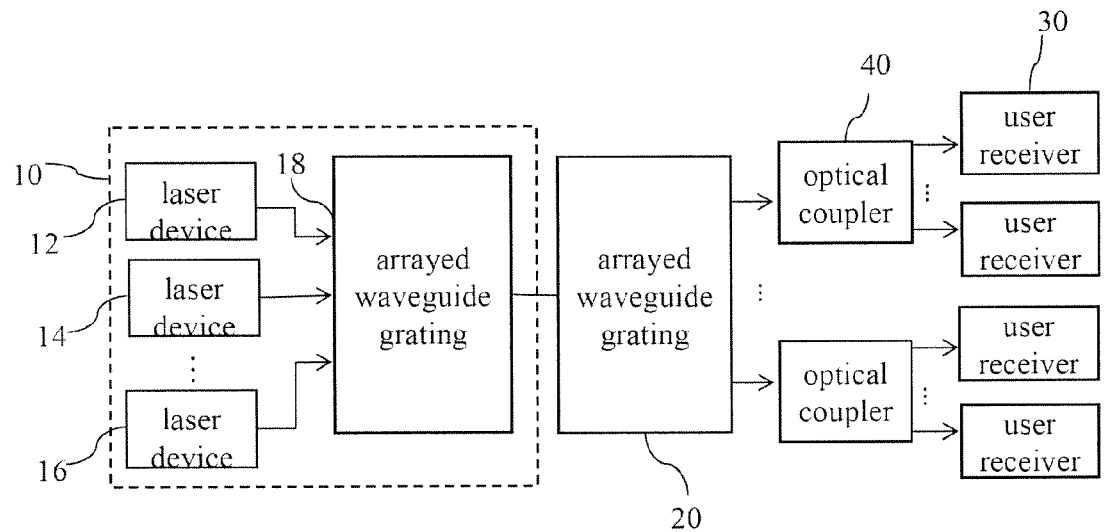
FIG. 2 is a schematic block diagram illustrating a wavelength-division multiplexing (WDM)-time-division multiplexing (TDM) passive optical network (PON) system according to an embodiment of the prior art.

1, the WDM-PON comprises a signal provider 10 which comprises a plurality of laser devices 12~16, laser devices 12~16 is an integrated device comprising a laser element and a modulator. The laser devices 12~16 respectively emit different wavelength signals, connect with an arrayed waveguide grating 18, and uses the arrayed waveguide grating (AWG) 18 to generate a set of wavelength signals composed of the different wavelength signals. The wavelength signals transmit to a far end. An AWG 20 is installed at the far end and connected with the AWG 18. The AWG 20 receives the different wavelength signals from the signal provider 10 and respectively transmits them to different user receivers 30. Due to the fact a single wavelength carries very high data capacity, the data capacity is provided to a plurality of user receivers 30 for using. Thus, the WDM-TDM-PON is used to effectively integrate optical networks. The WDM-TDM-PON means the integration architecture of the WDM-PON and the TDM-PON. Compared with the WDM-PON, the TDM-PON uses a single wavelength carrying the data of all users. The different periods are respectively allocated to the different users. Each user uses a specific wavelength to downstream or upstream data according to the allocated period. Refer to FIG. 2, the WDM-TDM-PON has the properties of the WDM-PON and the TDM-PON. The AWG 20 of the WDM-PON connects with an optical coupler 40. The optical coupler 40 broadcasts a downstream signal to the user receivers 30 of an identical wavelength. The different user receivers 30 receive or upstream data according to the allocated period.

Figure 3:
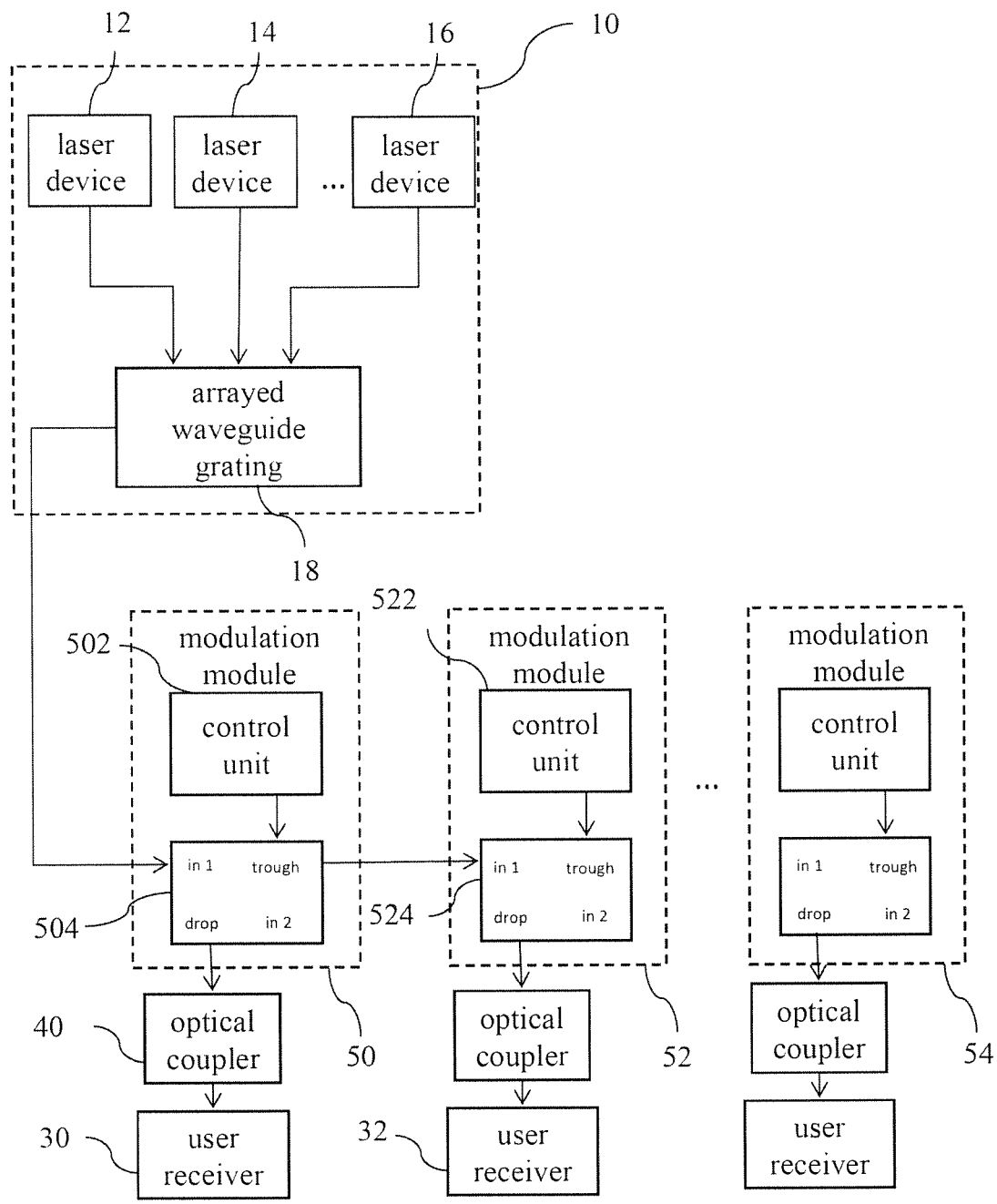
FIG. 3 is a schematic block diagram illustrating a system according to an embodiment of the present invention.

The present invention applies to the WDM-PON and the WDM-TDM-PON. The embodiment is exemplified by the WDM-TDM-PON. Refer to FIG. 3, a signal provider 10 comprises a plurality of laser devices 12~16. The laser devices 12~16 respectively emit different wavelength signals, connect with an arrayed waveguide grating 18, and uses the arrayed waveguide grating (AWG) 18 to generate a set of wavelength signals composed of the different wavelength signals. The signal provider 10 transmit the wavelength signals to a plurality of modulation modules 50~54 which replace the AWG 20 of the traditional technology installed at the far end. Each modulation module 50~54 comprises a control unit and a first modulation unit. The embodiment exemplifies the modulation modules 50 and 52. The modulation module 50 comprises a control unit 502 and a first modulation unit 504. The modulation module 52 comprises a control unit 522 and a first modulation unit 524. Take the modulation module 50 for example. The control unit 502 generates a random sequence and a control signal corresponding to the random sequence. The first modulation unit 504 is a silicon ring, a Fiber Bragg grating, or an optical circulator. The embodiment exemplifies the silicon ring. The silicon ring has four ports which respectively named a through port, a drop port, a first input (in 1), and a second input (in 2). The first input (in 1) of the first modulation unit 504 retrieves one wavelength signal according to the control signal generated by the control unit 502. The control unit 502 rapidly changes the control signal according to the random sequence to rapidly retrieve the wavelength signals of the different wavelengths. The retrieved wavelength signals transmit to an optical coupler 40 via the drop port, and then broadcasts to all the user receivers 30 of an identical wavelength. The other wavelength signals transmit to the following modulation module 52 via the through port.

Figure 4:
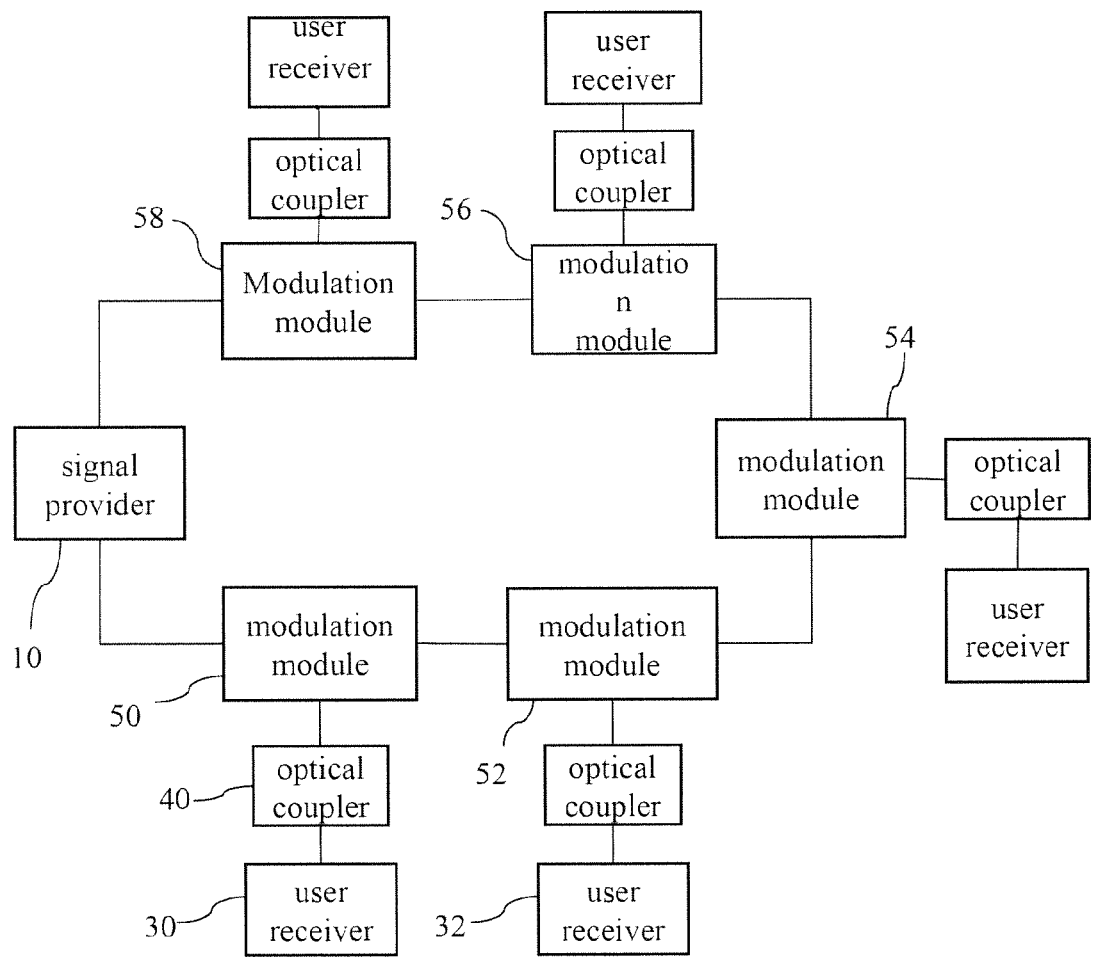
FIG. 4 is a schematic block diagram illustrating a ring arrangement of a WDM passive optical fiber network system according to an embodiment of the present invention.

Refer to FIG. 4, according to the arrangement of the user receivers 30~32, the modulation modules 50~58 are connected in series to form a ring network. The signal provider 10 transmits the wavelength signals to one modulation module 50, and the modulation module 50 retrieves one wavelength signal according to the random sequence and broadcasts the wavelength signal to the user receiver 30 via the optical coupler 40, and the modulation module 50 transmits the other wavelength signals to the following modulation module 52, whereby the following modulation module 52 retrieves one wavelength signal and transmits it to the following user receiver 32.

Figure 5:
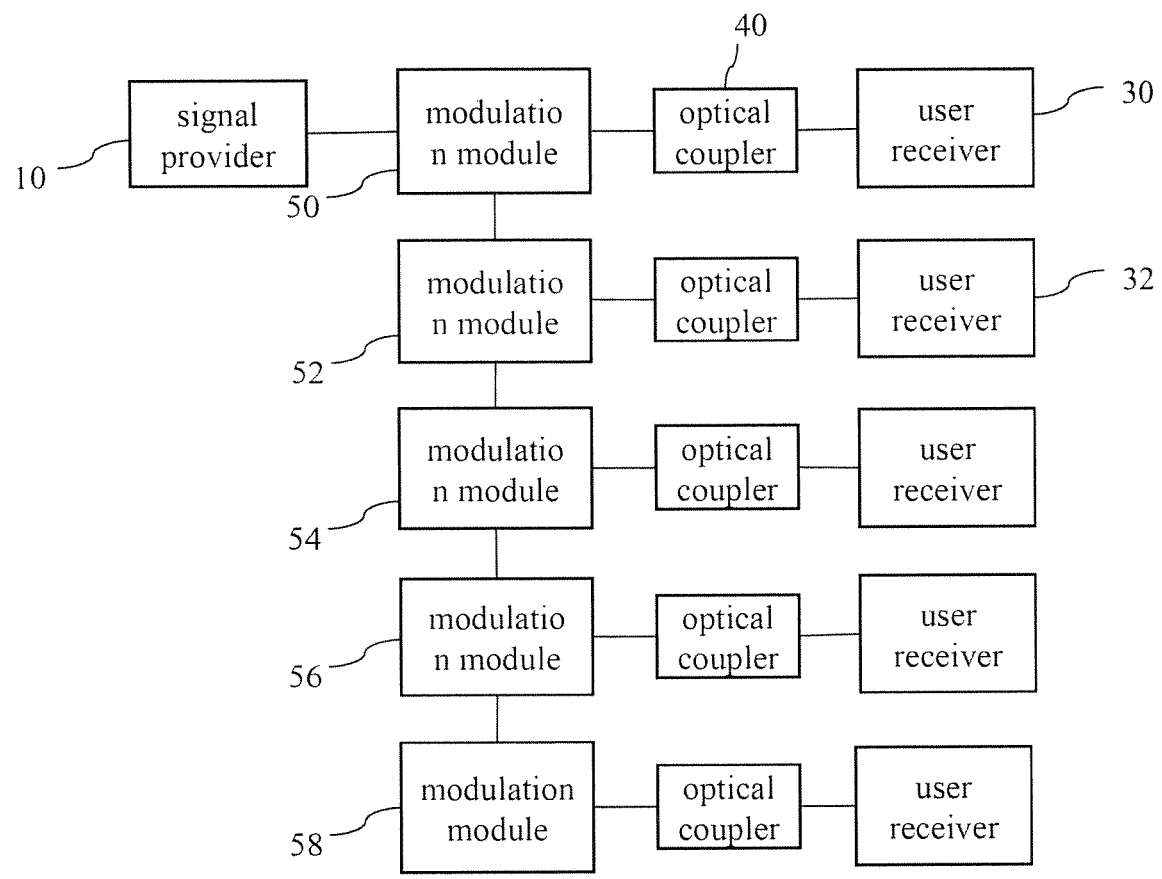
FIG. 5 is a schematic block diagram illustrating a tree arrangement of a WDM passive optical fiber network system according to an embodiment of the present invention.

Alternatively, refer to FIG. 5, the present invention is arranged into a tree network. According to the tree arrangement of the user receivers, the modulation modules 50~58 are connected in parallel to form a tree network whereby the modulation module 50 retrieves one wavelength signal according to the random sequence and broadcasts the wavelength signal to the user receiver 30 via the optical coupler 40, and the modulation module 50 transmits the other wavelength signals to the following modulation module 52, whereby the following modulation module 52 retrieves one wavelength signal and transmits it to the following user receiver 32.

Refer to FIG. 3 and FIG. 4. The process of transmitting signals is introduced as below. The embodiment exemplifies the tree network. The signal provider 10 generates a set of wavelength signals of a plurality of different wavelengths and transmits them to the first modulation unit 504 of the modulation module 50. The control unit 502 generates the random sequence and a control signal corresponding to the random sequence. The first input (in 1) of the first modulation unit 504 retrieves one wavelength signal according to the control signal, and then the retrieved wavelength signal transmits to the optical coupler 40 via the through port. The optical coupler 40 broadcasts the retrieved wavelength signal to all the user receivers 30 of an identical wavelength. The other wavelength signals transmit from the through port of the first modulation unit 504 to the first input (in 1) of the following modulation unit 52. The control unit 502 of the modulation unit 52 generate a random sequence, and generate a control signal according to the random sequence whereby the first modulation unit 504 retrieves one wavelength signal according to the random sequence and transmits the wavelength signal to the user receiver 32. The other wavelength signals transmit from the through port to the following modulation unit 54. From the same token, the other wavelength signals transmit to modulation modules 56 and 58. The random sequence rapidly changes with time. As a result, the control unit 502 rapidly changes the control signal according to the random sequence whereby the first modulation unit 504 rapidly retrieves the wavelength signals of different wavelengths, and whereby the wavelengths used by the user receivers 30 rapidly change. When an attacker can not make sure of the wavelength used by the user receiver 30, the attack is not achieved. By the technique, the wavelength signal used by an identical user receiver 30 changes with time. In other words, when the malicious attacker can not find out the wavelength signal of a target, it is hard to achieve eavesdropping, denial-of-service (DOS) and masquerading.

The control unit 502 is a thermal-control device generating thermal-control signals of different temperature according to the random sequence, and controlling the first modulation unit 504 to retrieve one wavelength signal according to the thermal-control signals. Alternatively, the control unit 502 is an electric-control device generating different electric-control signals according to the random sequence, and controlling the first modulation unit 504 to retrieve one wavelength signal according to the electric-control signals. The random sequence can constantly changes the wavelength signals by the thermal-control or electric-control way.

Figure 6:
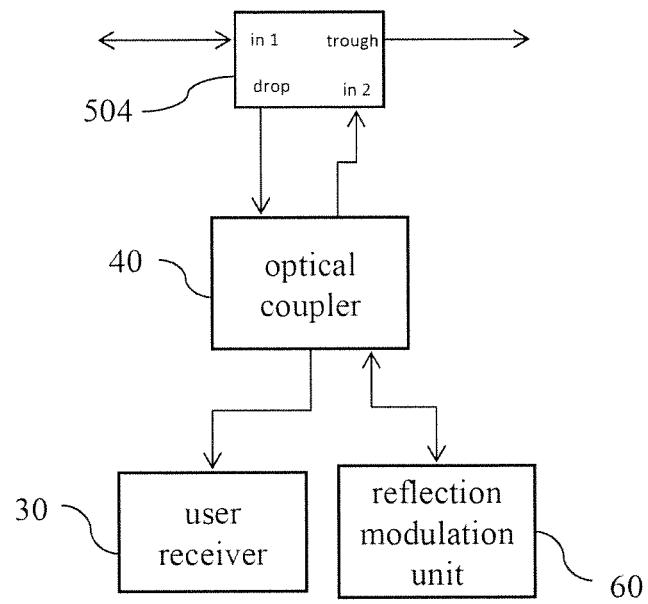
FIG. 6 is a schematic block diagram partially illustrating a re-modulation type system according to an embodiment of the present invention.

In general, the network system needs to transmit upstream data and downstream data. The present invention can use re-modulation or carrier distribution to transmit the upstream signals. The architecture of FIG. 6 is used to perform re-modulation. The first input (in 1) of the first modulation unit 504 receives the wavelength signal, and then the wavelength signal transmits from the drop port to the optical coupler 40. The optical coupler 40 broadcasts the wavelength signal to the user receiver 30 and a reflection modulation unit 60. The reflection modulation unit 60 is exemplified by a reflective semiconductor optical amplifier (RSOA) in the embodiment. The reflection modulation unit 60 re-modulates the wavelength signal to generate an upstream-modulated signal. The reflection modulation unit 60 transmits the upstream-modulated signal to the signal provider 10 through the second input (in 2) of the first modulation unit 504.

Figure 7:
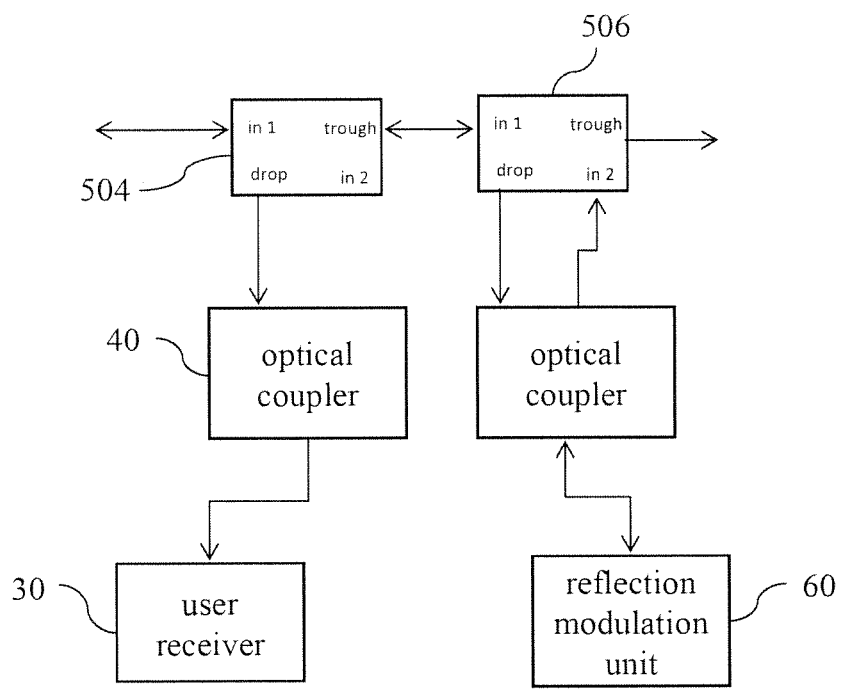
FIG. 7 is a schematic block diagram partially illustrating a carrier distribution type system according to an embodiment of the present invention.

The architecture of FIG. 7 is used to perform carrier distribution. A second modulation unit 506 newly added in the modulation module 50 and coupled to the first modulation unit 504. The first input (in 1) of the second modulation unit 506 is coupled to the through port of the first modulation unit 504. The signal provider 10 emits an optical carrier and transmits it and the wavelength signals to a far end. After the first modulation unit 504 receives the wavelength signal, the wavelength signal transmits from the drop port of the first modulation unit 504 to the optical coupler 40. The optical coupler 40 broadcasts the wavelength signal to the user receivers 30. The wavelength signal transmits from the through port of the first modulation unit 504 to the second modulation unit 506 whereby the drop port of the second modulation unit 506 sends out the wavelength signal to a reflection modulation unit 60. The reflection modulation unit 60 uses the optical carrier to carry the wavelength signal to generate an upstream signal. The reflection modulation unit 60 transmits the upstream signal to the signal provider 10 through the second input (in 2) of the second modulation unit 506.

Figure 8:
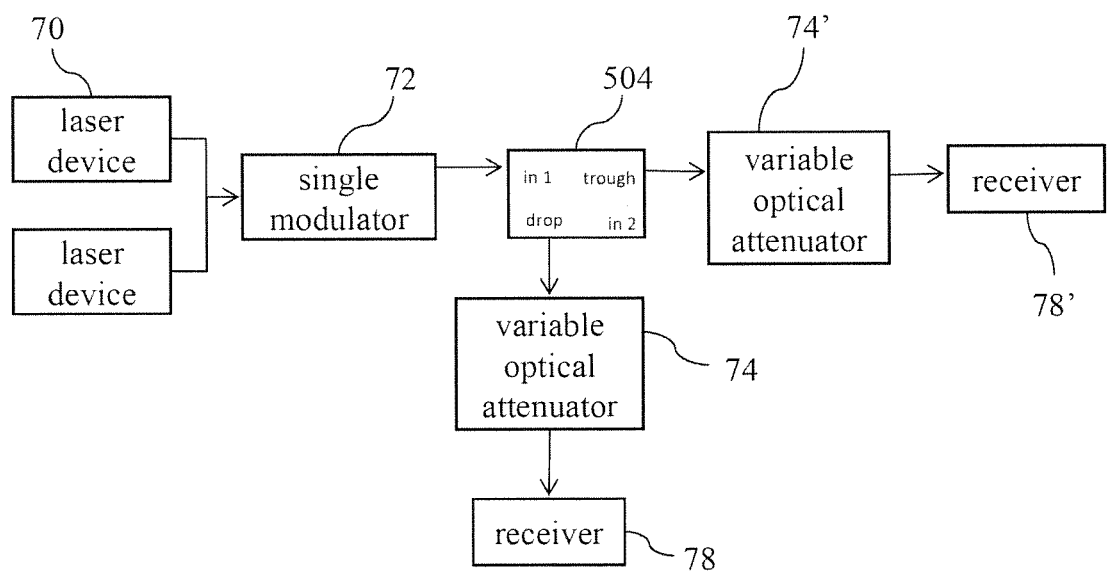
FIG. 8 is a schematic block diagram illustrating an experimental system transmitting a downstream signal according to an embodiment of the present invention.
Figure 9:
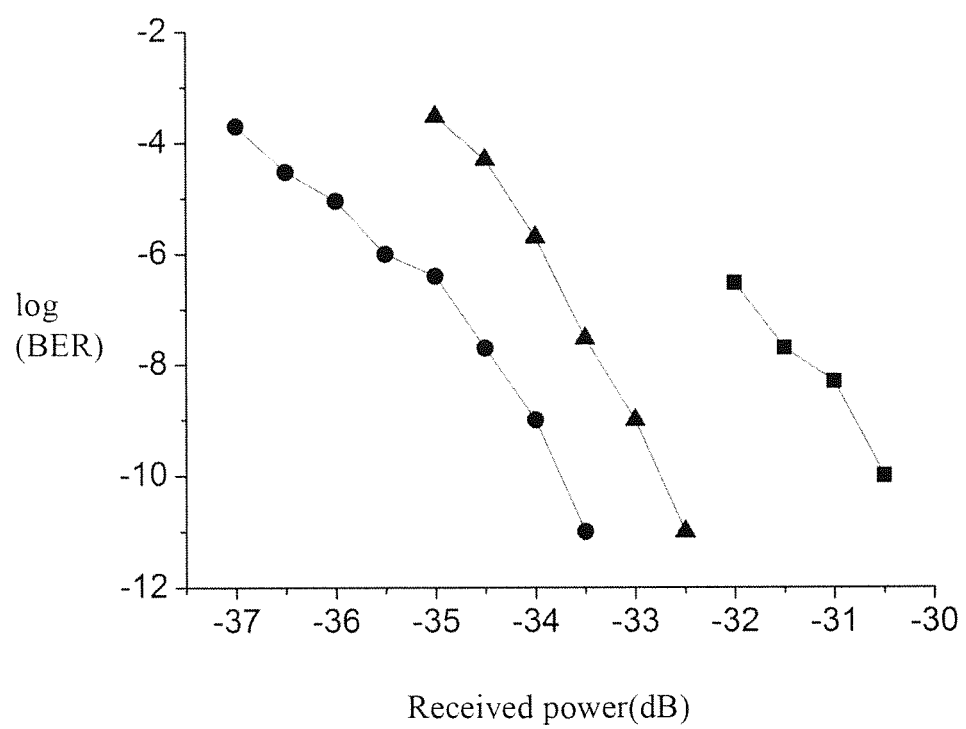
FIG. 9 is a schematic diagram illustrating a result for transmitting the downstream signal.

The experimental results of the present invention are introduced as below. The experimental system for transmitting downstream signals is shown in FIG. 8. Two laser devices 70, laser device 70 is an integrated device comprising a laser element and a modulator. Two laser devices 70 emit optical signals to a first modulation unit 504 through a single modulator 72. Then, the optical signals respectively transmit from the through port and the drop port of the first modulation unit 504 to two variable optical attenuators (VOAs) 74 and 74'. Finally, the optical signals respectively transmit to two receivers 78 and 78' whereby the optical signals respectively passing through the through port and the drop port are measured. The experimental results are shown in FIG. 9. The circles denote the optical signal of back-to-back (B2B) measurement after transmitting 25 kilometers. The triangles denote the optical signal from the drop port after sequentially transmitting 25 and 8 kilometers. The squares denote the optical signal from the through port after transmitting 25 kilometers. From FIG. 9, it is known that the optical signals of the B2B measurement, the drop port and the through port respectively have the power penalty of 1 dB. The power penalties of the drop port and the through port of the first modulation unit 504 may result from the difference of the extinction ratio of the two ports. The optical signal from the through port transmitting 8 kilometers has the power penalty of about 1 dB since the drop port of the preceding stage first modulation unit 504 incompletely filters out the optical signal to induce the interference of two wavelength signals.

Figure 10:
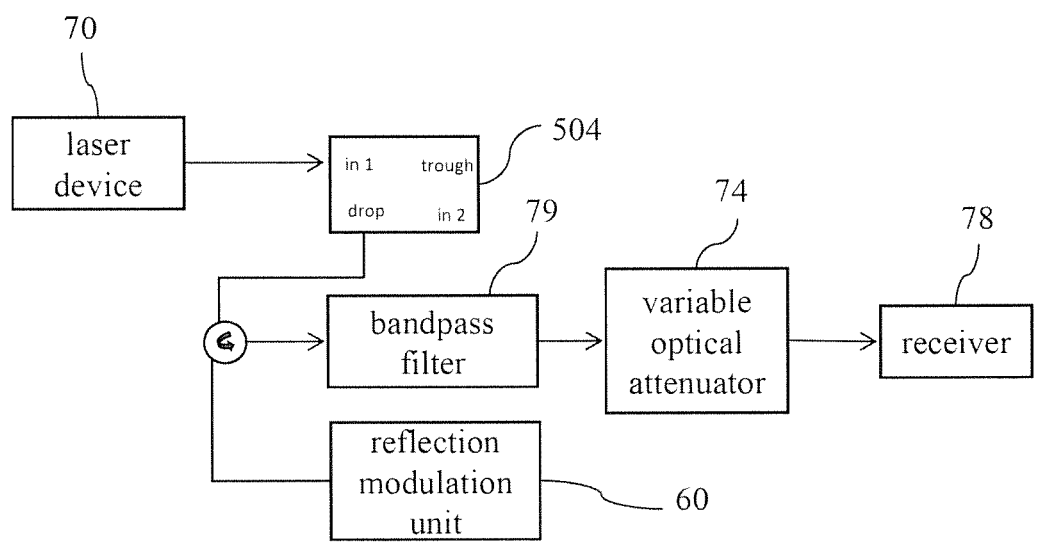
FIG. 10 is a schematic block diagram illustrating an experimental system transmitting an upstream signal according to an embodiment of the present invention.
Figure 11:
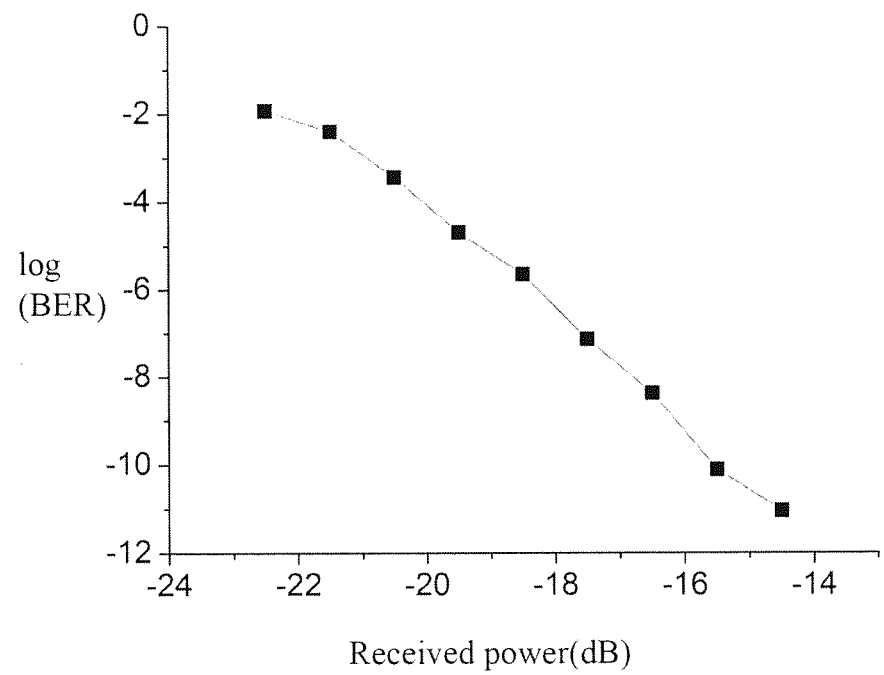
FIG. 11 is a schematic diagram illustrating a result for transmitting the upstream signal.

Refer to FIG. 10 and FIG. 11. The experimental system for transmitting upstream signals is shown in FIG. 10. A laser device 70, laser device 70 is an integrated device comprising a laser element and a modulator. A laser device 70 emits an optical signal to a first modulation unit 504. A bandpass filter 79 is used to simulate the optical signal transmitting back to the optical network through the first modulation unit 504. In addition, the optical signal transmits from the first modulation unit 504 to a receiver 78 through a variable optical attenuator74whereby the optical signal is measured. The experimental results of the upstream signals are shown in FIG. 11. When a current of 60 mA is injected, the upstream signal has the best quality. When an ultra-low current is injected, the reflection modulation unit 60 incompletely functions. When an ultra-high current injected, the efficiency of the reflection modulation unit 60 is reduced due to saturation and bandwidth change.

In conclusion, the present invention generates a pseudo random sequence merely identified by a signal provider and a user receiver, and uses the pseudo random sequence to rapidly change wavelength signals, so as to prevent a specific wavelength signal from attack, whereby the wavelength signal is not invaded and varied. Since wavelengths rapidly changes, general instruments are hard to detect the change and the security of a fiber network can be improved.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A wavelength-division multiplexing (WDM) optical fiber network system comprising:
   a signal provider generating at least one set of optical signals of a plurality of different wavelengths;
   a plurality of modulation modules coupled to said signal provider, and each said modulation module comprises:
      a control unit generating control signals representing a random sequence of said plurality of different wavelengths of said optical signals, said random sequence of said plurality of different wavelengths of said optical signals being pre-identified for at least one user receiver, a succession of said control signals being output in correspondence to said random sequence of said plurality of different wavelengths of said optical signals; and
      at least one first modulation unit coupled to said signal provider and said control unit to receive said plurality of different wavelengths of said optical signals, selectively retrieving one of said plurality of different wavelength optical signals according to said control signal, and responsive to said succession of said control signals being output by said control unit, said first modulation unit retrieving corresponding different wavelength optical signals and
   a plurality of user receivers each coupled to one of said modulation modules to successively receive said one of said plurality of different wavelength optical signals retrieved by said modulation module according to said pre-identified random sequence thereof.

2. The WDM optical fiber network system according to claim 1, wherein said modulation module further comprises a second modulation unit coupled to said first modulation unit, using carrier distribution to modulate said retrieved wavelength optical signal, and transmitting it to said signal provider, and said first modulation unit receives said retrieved wavelength optical signal and transmits it to said user receiver and said second modulation unit, and said second modulation unit transmits said retrieved wavelength optical signal to a reflection modulation unit to generate an upstream signal, and said reflection modulation unit transmits said upstream signal to said signal provider through said second modulation unit.

3. The WDM optical fiber network system according to claim 1, wherein said modulation module re-modulates said retrieved wavelength optical signal and transmits it to said signal provider, and said first modulation unit transmits said retrieved wavelength optical signal to said user receiver and a reflection modulation unit, and said reflection modulation unit re-modulates said retrieved wavelength optical signal to generate an upstream-modulated optical signal, and said reflection modulation unit transmits said upstream-modulated optical signal to said signal provider through said first modulation unit.

4. The WDM optical fiber network system according to claim 1, wherein said control unit is a thermal-control device generating thermal-control signals of different temperature according to said random sequence of said plurality of different wavelengths of said optical signals, and controlling said first modulation unit to retrieve said one of said plurality of different wavelength optical signals according to said thermal-control signals.

5. The WDM optical fiber network system according to claim 1, wherein said control unit is an electric-control device generating different electric-control signals according to said random sequence random sequence of said plurality of different wavelengths of said optical signals, and controlling said first modulation unit to retrieve said one of said plurality of different wavelength optical signals according to said electric-control signals.

6. The WDM optical fiber network system according to claim 1, wherein said signal provider further comprises a plurality of laser devices respectively emitting different wavelength optical signals, connected with an arrayed waveguide grating, and using said arrayed waveguide grating to generate said at least one set of optical signals composed of different wavelengths.

7. The WDM optical fiber network system according to claim 1, further comprises an optical coupler coupled to said first modulation unit to broadcast said retrieved wavelength optical signal to said user receiver.

8. The WDM optical fiber network system according to claim 1, wherein said modulation modules are connected in series to form a ring network, and said signal provider transmits said set of optical signals to said one of said modulation modules, and said one of said modulation modules retrieves said one of said plurality of different wavelength optical signals according to said random sequence of said plurality of different wavelengths of said optical signals and transmits said one of said plurality of different wavelength optical signals to said user receiver, and said one of said modulation modules transmits others of said set of optical signals to following ones of said plurality of modulation modules, whereby said following ones of said plurality of modulation modules respectively retrieve other ones of said plurality of different wavelength optical signals and transmits said retrieved optical signal to at least a corresponding one of said plurality of user receivers.

9. The WDM optical fiber network system according to claim 1, wherein said plurality of modulation modules are connected in parallel to form a tree network whereby different wavelengths of said optical signals are respectively transmitted to said user receivers according to said random sequence of said plurality of different wavelengths of said optical signals.

10. The WDM optical fiber network system according to claim 2, wherein said first modulation unit and said second modulation unit are silicon rings.

11. The WDM optical fiber network system according to claim 2, wherein said first modulation unit and said second modulation unit are Fiber Bragg gratings (FBGs) or optical circulators.

* * * * *